(12) United States Patent
Nishikawa et al.

(10) Patent No.: US 6,569,009 B2
(45) Date of Patent: May 27, 2003

(54) AIR PASSAGE OPENING AND CLOSING SYSTEM AND AIR CONDITIONING SYSTEM HAVING THE SAME

(75) Inventors: Katsumi Nishikawa, Kariya (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/115,703

(22) Filed: Apr. 3, 2002

(65) Prior Publication Data

US 2002/0146976 A1 Oct. 10, 2002

(30) Foreign Application Priority Data

Apr. 4, 2001 (JP) ........................... 2001-106405

(51) Int. Cl.[7] ................................................. B60H 1/26
(52) U.S. Cl. ............................................... 454/121
(58) Field of Search ........................... 454/121, 156; 165/42, 43; 251/358

(56) References Cited

U.S. PATENT DOCUMENTS 5,720,657 A * 2/1998 Kamiya et al. ............. 454/121
6,508,703 B1 * 1/2003 Uemura et al. ............. 454/156

FOREIGN PATENT DOCUMENTS

| JP | 8-2238 | 1/1996 |
| JP | 2001-253222 | * 9/2001 |

* cited by examiner

Primary Examiner—Harold Joyce
(74) Attorney, Agent, or Firm—Harness, Dickey & Pierce, PLC

(57) ABSTRACT

An air-conditioning case of an air-conditioning unit forms air passages therein. A film member is reciprocably supported in the case and has free ends. Reinforcing members are secured to the lower end of the film member. A drive force for reciprocating the film member is applied to the film member from a motor through a drive shaft and drive gears, which are attached to the drive shaft, to open and close the air passages with the film member. When the film member is moved upwardly, the reinforcing members abut against positioning portions of the case to position the film member at a predetermined position.

17 Claims, 8 Drawing Sheets

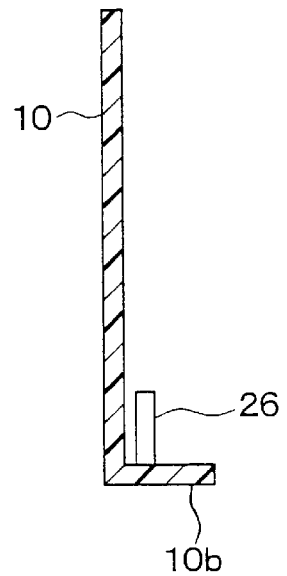
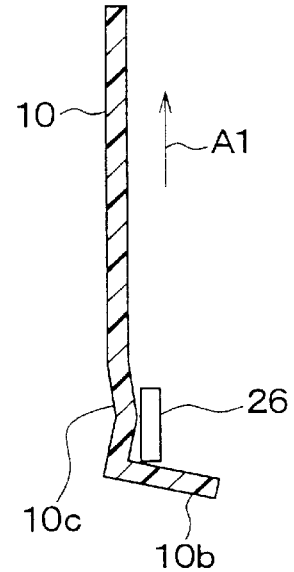
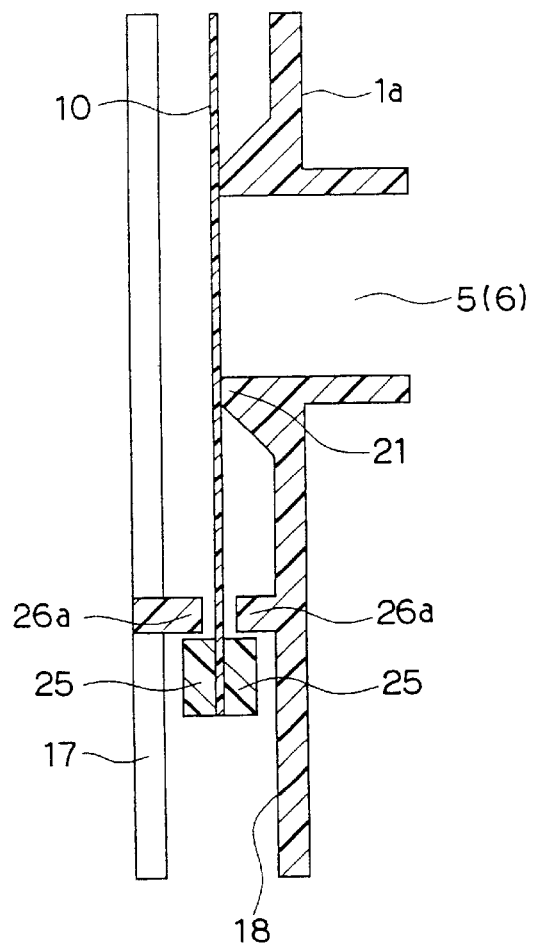

AIR PASSAGE OPENING AND CLOSING SYSTEM AND AIR CONDITIONING SYSTEM HAVING THE SAME

CROSS REFERENCE TO RELATED APPLICATION

This application is based on and incorporates herein by reference Japanese Patent Application No. 2001-106405 filed on Apr. 4, 2001.

BACKGROUND OF THE INVENTION

1. Field of the Invention

The present invention relates to an air passage opening and closing system, which is particularly suitable for use in a vehicle air conditioning system, for opening and closing an air passage by moving a film member (film door) across the air passage.

2. Description of Related Art

For example, Japanese Unexamined Patent Publication No. 8-2238 discloses an air passage opening and closing system for opening and closing an air passage by moving a film member across the air passage. In this system, a drive shaft and a driven shaft are supported in an air-conditioning case in a rotatable manner. Opposite ends of the flexible film member, such as a resin film, are connected to the drive shaft and the driven shaft, respectively. Furthermore, pulleys are coaxially connected to one end of the drive shaft and one end of the driven shaft, respectively, on the same lateral side. Ends of a wire are wound around the pulleys, respectively, to synchronize the rotation of the drive shaft with the rotation of the driven shaft. Furthermore, a motor is connected to the drive shaft to rotate the drive shaft.

When the drive shaft is rotated in a winding direction for winding the film member around the drive shaft, the film member is directly wound around the drive shaft to move the film member. On the other hand, when the drive shaft is rotated in an unwinding direction opposite to the winding direction, the rotation of the drive shaft is transmitted to the driven shaft through the pulleys and the wire. Thus, the driven shaft is rotated to wind the film member around the driven shaft to move the film member.

By moving the film member in the air-conditioning case forward and backward, the air passage is opened and closed.

In the above system, the ends of the film member are connected to the drive shaft and the driven shaft, respectively, to wind the film member. Thus, the drive shaft and the driven shaft need to be synchronized with respect to one another. As a result, the synchronizing mechanism, which includes the pulleys and the wire, is required. This causes an increase in a number of components of the system, which in turn results in a tedious time consuming assembling work and an increase in manufacturing costs.

SUMMARY OF THE INVENTION

The present invention addresses the above disadvantages. Thus, it is an objective of the present invention to provide a simplified air passage opening and closing system by eliminating a winding mechanism for winding a film member, which opens and closes at least one air passage in the air passage opening and closing system. It is another objective of the present invention to achieve an effective opening and closing operation of the air passage. It is a further objective of the present invention to improve positioning accuracy of the film member in the opening and closing operation of the air passage by the film member. It is a further objective of the present invention to provide an air-conditioning system of a vehicle having the simplified air passage opening and closing system.

To achieve the objectives of the present invention, there is provided an air passage opening and closing system including a case, a film member, at least one reinforcing member, a drive means for reciprocating the film member in first and second directions, and at least one positioning means for positioning the film member at a predetermined position. The case forms at least one air passage. The film member is reciprocable in the first and second directions in the case and has opposite first and second free ends. The film member opens and closes the at least one air passage depending on its position relative to the at least one air passage. The at least one reinforcing member is secured to the film member to provide additional strength to the film member. The at least one positioning means is arranged stationary relative to the case. When the film member is moved in one of the first and second directions, the at least one reinforcing member abuts against the at least one positioning means to position the film member at the predetermined position.

To achieve the objective of the present invention, there is alternatively provided an air passage opening and closing system including a case, a film member, at least one drive gear, a drive means for rotating the at least one drive gear, and at least one reinforcing member. The case forms at least one air passage. The film member is reciprocable in first and second directions in the case and has opposite first and second free ends. The film member opens and closes the at least one air passage depending on its position relative to the at least one air passage and includes at least one set of gear engaging portions. The gear engaging portions of the film member are arranged at substantially equal intervals in a direction parallel to the first and second directions. The at least one drive gear has a plurality of gear teeth, which are meshed with the at least one set of the gear engaging portions of the film member to reciprocate the film member. The at least one reinforcing member is secured to the film member between the at least one set of the gear engaging portions and one of the first and second free ends to provide additional strength to the film member. When the film member is moved in one of the first and second directions, at least one of the teeth of the at least one drive gear is securely engaged with the at least one reinforcing member to position the film member at a predetermined position.

To achieve the objectives of the present invention, there is also provided an air-conditioning system of a vehicle including one of the above air passage opening and closing systems.

BRIEF DESCRIPTION OF THE DRAWINGS

The invention, together with additional objects, features and advantages thereof, will be best understood from the following description, the appended claims and the accompanying drawings in which:

FIG. 7A is a schematic partial cross-sectional view showing a positioning portion of an air outlet mode adjusting film member in a comparative example;

FIG. 7B is another schematic partial cross-sectional view similar to FIG. 7A showing the deformed positioning portion of the air outlet mode adjusting film member in the comparative example;

FIG. 8 is a schematic partial cross-sectional view showing positioning portions for positioning the air outlet mode adjusting film member according to a second embodiment of the present invention;

DETAILED DESCRIPTION OF THE INVENTION

Various embodiments of the present invention will be described with reference to the accompanying drawings.
(First Embodiment)

Figure 1:
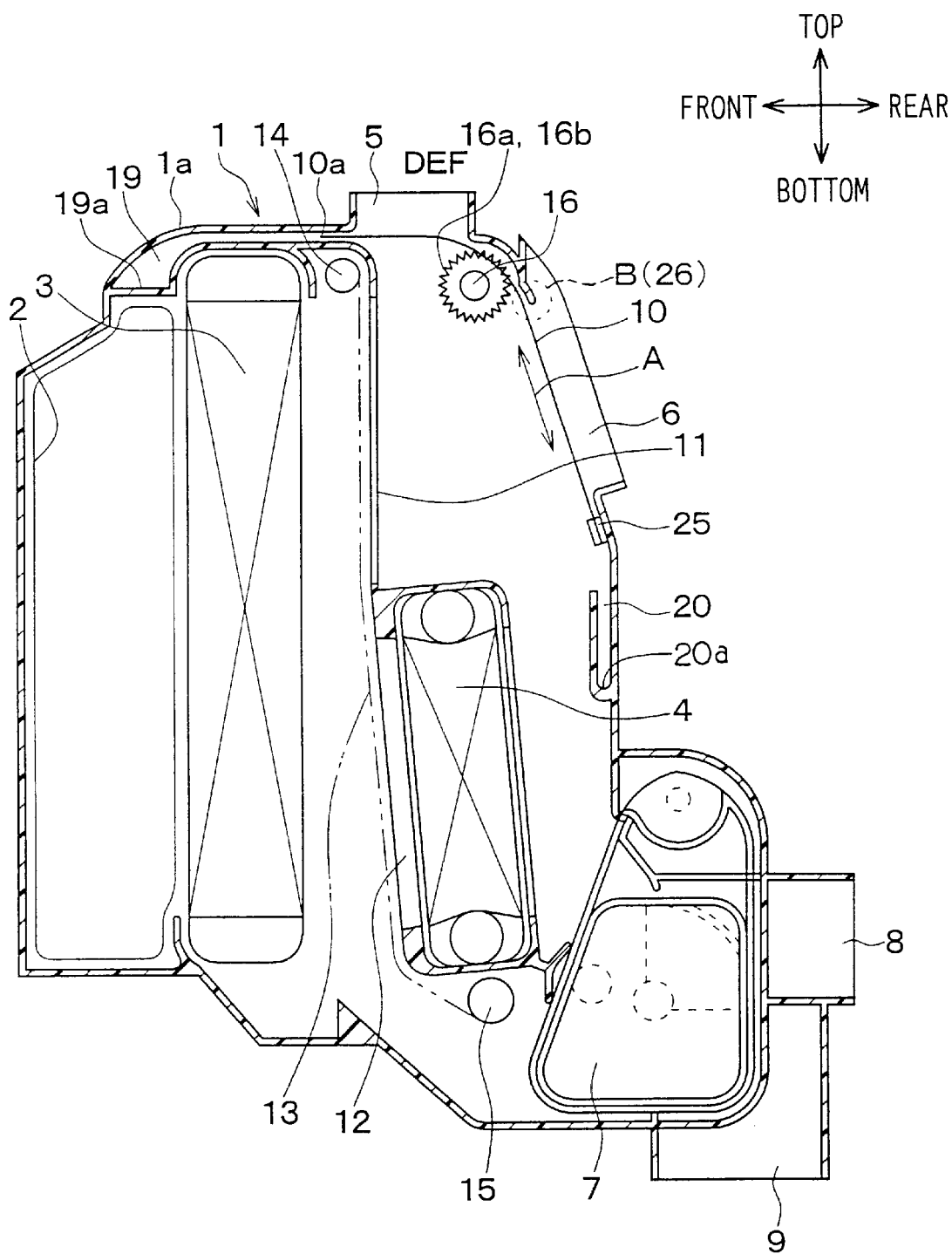
FIG. 1 is a cross-sectional view of an air-conditioning unit of a vehicle air-conditioning system according to a first embodiment of the present invention.
Figure 2:
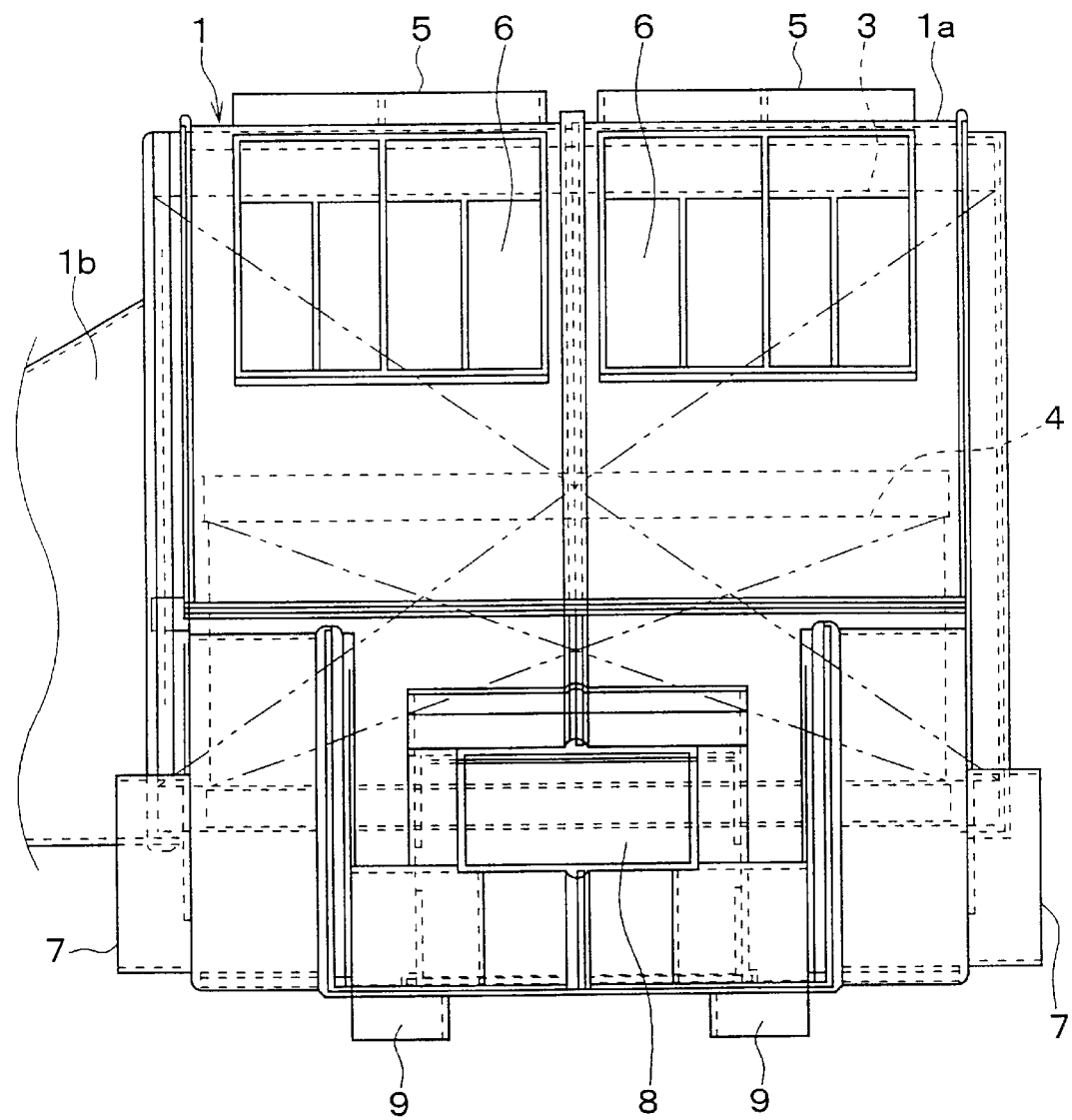
FIG. 2 is a front view of the air-conditioning unit of FIG. 1 seen from a passenger room side.

FIGS. 1 and 2 show a vehicle air-conditioning system according to a first embodiment of the present invention. The air-conditioning system includes an air-conditioning unit 1. The air-conditioning unit 1 includes an air-conditioning case (case member) 1a made of a resin material. The air-conditioning case 1a is substantially arranged at the center of a meter instrument panel placed in a passenger room of a vehicle. Furthermore, in the vehicle, the air-conditioning case 1a is positioned in a widthwise (left-right) direction of the vehicle, in a fore-aft (front-rear) direction of the vehicle and in a top-bottom direction of the vehicle in a manner shown in FIGS. 1 and 2.

The air-conditioning case 1a includes an air inlet 2 on the vehicle front side of the air-conditioning case 1a. In a case of a right hand drive vehicle, the air inlet 2 is positioned on a front passenger side (left side) of the air-conditioning case 1a. The vehicle air-conditioning system further includes an air blower unit (not shown), which is arranged on the front passenger side of the meter instrument panel. An air outlet opening of the air blower unit is connected to the air inlet 2 through a connecting duct 1b shown in FIG. 2. Thus, when a blower of the blower unit is activated, air (hereinafter, referred to as conditioning air) is blown into the air conditioning case 1a from the air inlet 2.

The air-conditioning case 1a contains an evaporator 3 and a heater core 4, which are arranged in this order in a flow direction of the conditioning air. The evaporator 3 is a cooling heat exchanger normally provided in a known type of refrigeration cycle. In the evaporator 3, a coolant fluid absorbs heat from the conditioning air supplied into the air-conditioning case 1a and evaporates, so that the conditioning air is cooled. The heater core 4 is a heating heat exchanger, which heats the conditioning air supplied into the air-conditioning case 1a using relatively high temperature water (engine coolant), which flows in the heater core 4 and acts as a heat source.

At a downstream end of the air-conditioning case 1a, a plurality of air outlet openings 5–9 are formed. Two of the air outlet openings 5–9 are referred to as defroster-side openings 5. Each defroster-side opening 5 is arranged in a top surface of the air-conditioning case 1a and is connected to a corresponding defroster-side duct (not shown). The conditioning air is blown toward an interior side surface of a front windshield (front glass) from each defroster outlet opening arranged at a distal end of the defroster-side duct. Other two of the air-outlet openings 5–9 are referred to as front seat face-side openings 6. The front seat face-side openings 6 are arranged at upper left and right sides, respectively, of the air-conditioning case 1a on the vehicle rear side of the air-conditioning case 1a. A face-side duct (not shown) is connected to each front seat face-side opening 6. The conditioning air is blown toward an upper half of a driver's body and an upper half of a front passenger's body from the front seat face-side openings 6 through face-side air outlet openings arranged at distal ends of the face-side ducts.

Furthermore, other two of the air outlet openings 5–9 are referred to as front seat foot-side openings 7. The front seat foot-side openings 7 are arranged at lower left and right sides, respectively, of the air-conditioning case 1a on the vehicle rear side of the air-conditioning case 1a. The conditioning air is blown from the front seat foot-side openings 7 toward feet of the driver and feet of the front passenger. Another one of the air outlet openings 5–9 is referred to as a rear seat face-side opening 8. Rear seat face-side ducts (not shown) are connected to the rear seat face-side opening 8. The conditioning air is blown toward an upper half of each rear passenger's body from the rear seat face-side opening 8 through the corresponding rear seat face-side duct. Other two of the air outlet openings 5–9 are referred to as rear seat foot-side openings 9. Rear seat foot-side ducts (not shown) are connected to the rear seat foot-side openings 9, respectively. The conditioning air is blown toward feet of each rear passenger from the corresponding rear seat foot-side opening 9 through the corresponding rear seat foot-side duct.

In this embodiment, among the air outlet openings 5–9, the defroster-side openings 5 and the front seat face-side openings 6 are opened and closed by an air outlet mode adjusting film member 10. The air outlet mode adjusting film member 10 is a characteristic component of the present invention. The air outlet mode adjusting film member 10 has free ends (first and second ends), which are opposed to one another in a reciprocating direction (first and second directions) of the air outlet mode adjusting film member 10. Each of the remaining air outlet openings 7–9 is provided with a door means (not shown) for opening and closing it.

A cold air bypass passage 11 is formed above the heater core 4 in the air conditioning case 1a in such a manner that the cold air flows through the cold air bypass passage 11 without passing through the heater core 4. An air mixing film member 13 is reciprocably arranged in the air conditioning case 1a in such a manner that the air mixing film member 13 extends across both the cold air bypass passage 11 and an air passage 12 of the heater core 4.

The air mixing film member 13 acts as a temperature adjusting means for adjusting a temperature of the conditioning air blown into the passenger room of the vehicle by adjusting a ratio between the cold conditioning air, which passes through the cold air bypass passage 11, and the warm conditioning air, which passes through the air passage 12 of the heater core 4. Unlike the air outlet mode adjusting film member 10, the air mixing film member 13 has a structure of a known type.

That is, one end (upper end) of the air mixing film member 13 is connected to a drive shaft 14, which is driven by a motor (not shown). The other end (lower end) of the air mixing film 13 is connected to a driven shaft 15, which is rotated synchronously with the drive shaft 14. By winding and unwinding the ends of the air mixing film member 13 around the drive shaft 14 and the driven shaft 15, the air mixing film member 13 is reciprocated, and thus openings (not shown) provided in the air mixing film 13 are also moved to adjust a size of an open area of the cold air bypass passage 11 and a size of an open area of the air passage 12 of the heater core 4.

The structure and operation of the air outlet mode adjusting film member 10 will be further described below. In order to reduce a size of the air-conditioning case 1a, the air outlet mode adjusting film member 10 is arranged to reciprocate along a bent passage in the air-conditioning case 1a, as shown in FIG. 1. Because of this, the air outlet mode adjusting film member 10 is made of a thin flexible resin film member.

In the present embodiment, a drive shaft 16 is arranged only at one location in the length of the air outlet mode adjusting film member 10, which extends in its reciprocating direction (opposite first and second directions) A. More specifically, the drive shaft 16 is arranged only at an intermediate location between the defroster-side openings 5 and the front seat face-side openings 6. The drive shaft 16 is arranged on the upstream side of the air outlet mode adjusting film member 10 and extends in a widthwise direction of the air outlet mode adjusting film member 10. Two drive gears 16a, 16b are secured around the drive shaft 16 and are spaced from each other in an axial direction of the drive shaft 16.

The air outlet mode adjusting film member 10 is reciprocated by drive force transmitted from the drive gears 16a, 16b of the drive shaft 16. Thus, the ends of the air outlet mode adjusting film member 10, which are opposed to each other in the reciprocating direction A, are not connected to any winding mechanism and thus are formed as the free ends.

With the above drive mechanism, when the air outlet mode adjusting film member 10 is moved by the drive shaft 16 in the reciprocating direction, tensile force is applied from the drive shaft 16 to a trailing side of the traveling air outlet mode adjusting film member 10, and push force is applied from the drive shaft 16 to a leading side of the traveling air outlet mode adjusting film member 10.

Figure 4A:
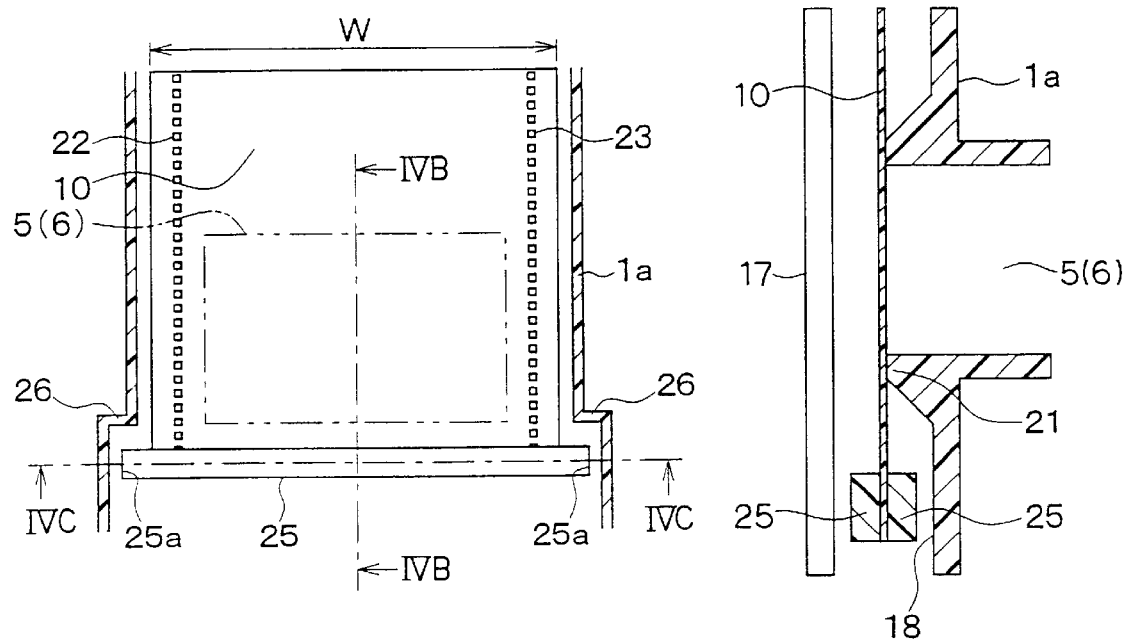
FIG. 4A is a partial plan cross-sectional view showing positioning portions for positioning the air outlet mode adjusting film member of the first embodiment.
Figure 4B:
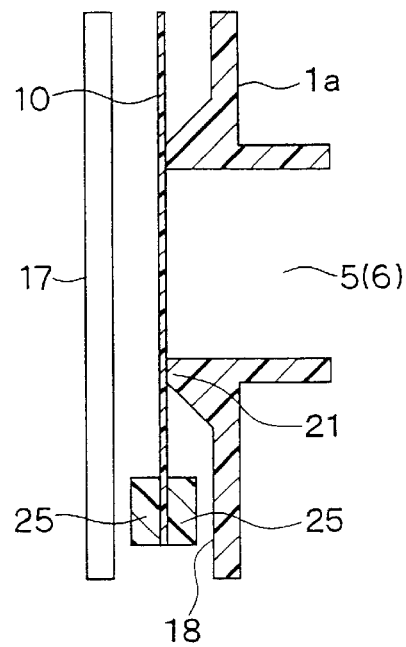
FIG. 4B is a cross-sectional view taken along line IVB—IVB in FIG. 4A.
Figure 4C:
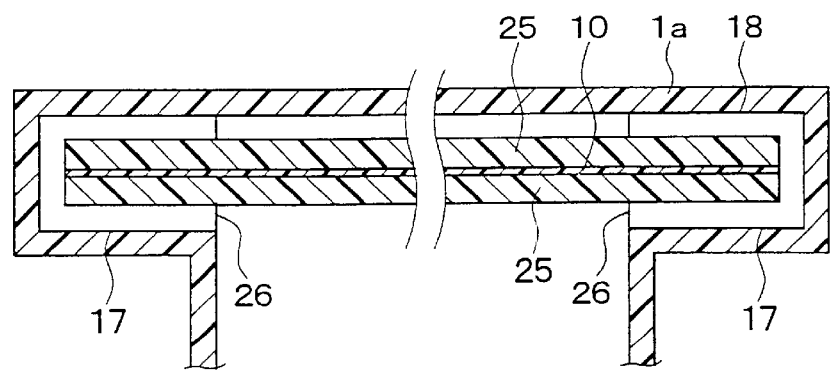
FIG. 4C is a cross-sectional view taken along line IVC—IVC in FIG. 4A.

Guides 17 are provided in the air-conditioning case 1a for guiding left and right lateral edge regions of the film member 10, respectively (FIG. 4C). The guides 17 are integrally formed in the air-conditioning case 1a. The lateral edge regions of the film member 10 are received between the guides 17 and an inner wall surface 18 of the air-conditioning case 1a to guide the lateral edge regions of the film member 10. In FIG. 1, although the guides 17 are not shown for the sake of simplicity, the guides 17 extend along an entire reciprocating path of the film member 10 except a region where the drive gears 16a, 16b are provided.

In the present embodiment, receiving spaces 19, 20 are provided in the case 1a at the ends of the film member 10, respectively, to receive the ends (free ends) of the film member 10, respectively. More specifically, the receiving space 19 is arranged above the evaporator 3, and the receiving space 20 is arranged below the front seat face-side openings 6. Each receiving space 19, 20 receives the corresponding end of the film member 10, which does not aid in the opening and closing operation of the openings 5, 6. Thus, the receiving spaces 19, 20 restrain undesirable effects induced by exposure of the ends of the film member 10 in the air passages (e.g., chattering of the film member 10 induced by the conditioning air).

A total open area of the front seat face-side openings 6 is much greater than a total open area of the defroster-side openings 5. Thus, the receiving space 19 located above the evaporator 3 (adjacent to the defroster-side openings 5) is made larger than the receiving space 20 located below the front seat face-side openings 6.

In order to move the air outlet mode adjusting film member 10 by the push force applied from the drive shaft 16 and to guide the air outlet mode adjusting film member 10 between the guides 17 and the case inner wall surface 18, the air outlet mode adjusting film member 10 needs to have sufficient predetermined rigidity. Thus, a material and a thickness of the film member 10 should be selected to achieve the predetermined rigidity of the film member 10. A preferred material of the film member 10 is a polyethylene terephthalate (PET) film, which is a resin film having a flexibility and a relatively small frictional resistance. Besides the PET film, an elastomer film having an appropriate rigidity can be used for the film member 10. A film thickness t1 (FIG. 5) of the film member 10 is, for example, about 100 $\mu$m in the case of the PET film.

As shown in FIG. 4B, a sealing projection 21 is integrally formed along entire outer peripheral edges of the air outlet opening 5, 6 and protrudes toward an interior of the air-conditioning case 1a, i.e., toward the film member 10. The film member 10 is urged against an apex of the sealing projection 21 by wind pressure of the conditioning air, which flows in the case 1a, so that the air outlet opening 5 or 6 can be reliably sealed.

Figure 3:
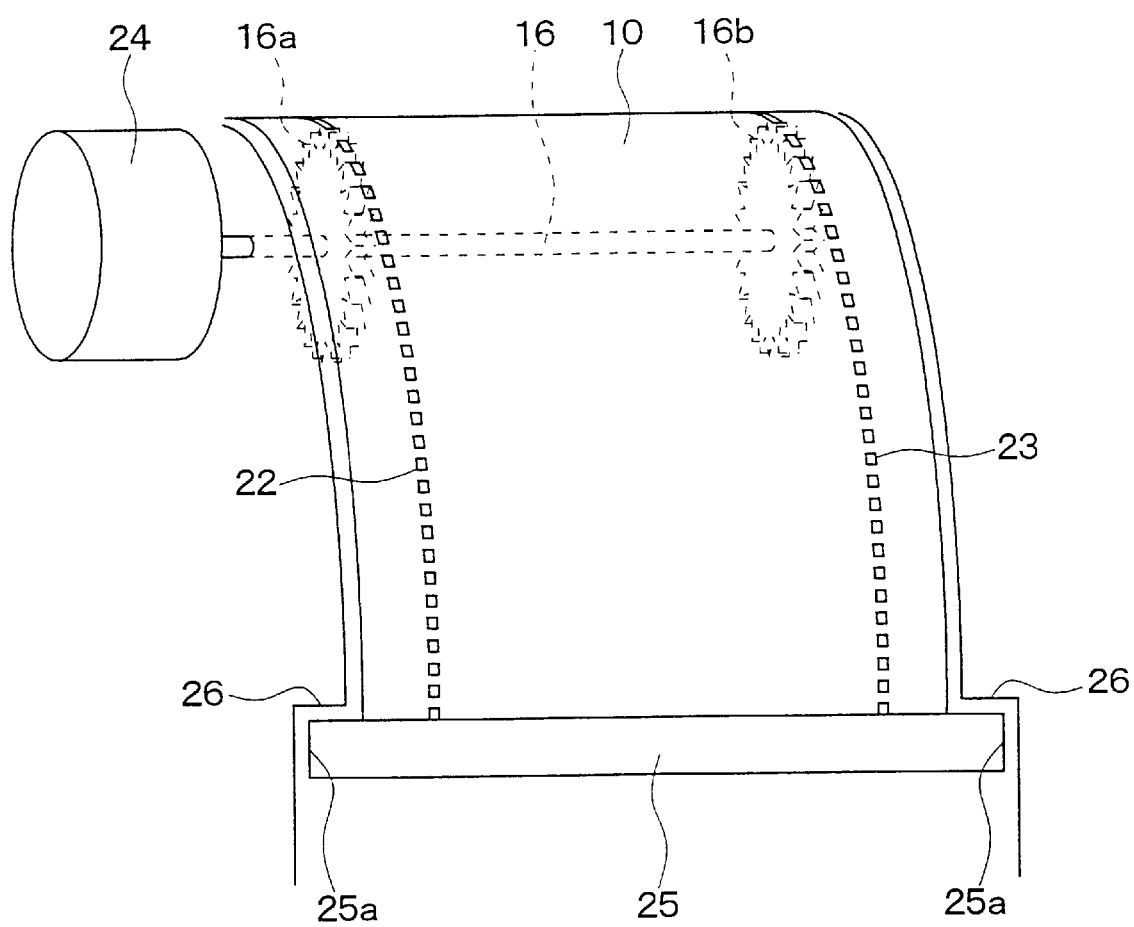
FIG. 3 is a schematic partial perspective view of a drive mechanism for reciprocating an air outlet mode adjusting film member according to the first embodiment.

A plurality of engaging holes (gear engaging portions) 22, 23 are provided along each of the left and right lateral edges of the film member 10 to mesh with gear teeth of the drive gears 16a, 16b, as shown in FIGS. 3 and 4. The engaging holes 22, 23 are arranged at predetermined intervals substantially along an entire length of the film member 10 in a direction parallel to the reciprocating direction A. As shown in FIG. 4A, the holes 22, 23 of the film member 10 are arranged laterally outward of the open area of the air outlet opening 5, 6 of the air-conditioning case 1a, so that conditioning air does not leak through the holes 22, 23 of the film member 10.

The drive shaft 16 is rotatably supported by the air-conditioning case 1a. One end of the drive shaft 16 protrudes outward through the air-conditioning case 1a and is connected with a drive motor (e.g., step motor) 24. The drive shaft 16 is rotated in both forward and backward directions by the drive motor 24 to apply the drive force to the film member 10 to move the film member 10 in the reciprocating direction A.

Reinforcing members 25 are secured to the lower end of the film member 10 to provide additional strength to the film member 10. When the film member 10 is moved upwardly, the reinforcing members 25 abut against positioning portions (stoppers) 26 (FIGS. 3 and 4A) provided in the air-conditioning case 1a to position the film member 10 at a predetermined position.

More specifically, in the first embodiment, each reinforcing member 25 has a rectangular plate shape and has a length that is longer than a width W of the film member 10 for a predetermined length (e.g., 5 to 10 mm). Opposite ends 25a of each reinforcing member 25 extend outwardly from the lateral edges of the film member 10, respectively, in the widthwise direction of the film member 10. The positioning portions (positioning means) 26 are provided in a form of steps in the inner wall surface of the air-conditioning case 1a. In this embodiment, the positioning portions 26 are arranged below the drive gears 16a, 16b at a predetermined location indicated with a dotted line B in FIG. 1.

With reference to FIG. 1, when the film member 10 is moved upward, and thus the reinforcing members 25 are moved to the predetermined position B where the positioning portions 26 are located, the ends 25a of the reinforcing members 25 abut against the positioning portions 26 of the inner wall surface of the air-conditioning case 1a. As a result, further movement of the film member 10 is prevented, and thus the film member 10 is positioned there.

Here, even if the reinforcing members 25 are moved to the predetermined position B of the positioning portions 26, a leading end 10a of the traveling film member 10 does not contact an innermost wall surface 19a of the upper receiving space 19, which is located in the innermost point of the receiving space 19. That, is, the predetermined position B of the positioning portions 26 is selected such that the reinforcing members 25 abut against the positioning portions 26 to position the film member 10 at the predetermined position before the leading end 10a of the traveling film member 10 contacts the innermost wall surface 19a of the upper receiving space 19, thus restraining the leading end 10a of the film member 10 from contacting the innermost wall surface 19a of the upper receiving space 19.

Each reinforcing member 25 has the rectangular plate shape and is made of a resin material, such as a fiberglass-reinforced acrylonitrile-butadiene-styrene (ABS) resin, which has rigidity higher than that of the film member 10. The reinforcing members 25 sandwich the corresponding end (first and second surfaces of the corresponding end) of the film member 10 therebetween. A thickness t2 (FIG. 5) of each reinforcing member 25 is sufficiently greater than the thickness t1 of the film member 10 and is, for example, about 1 to 2 mm. A width W1 of each reinforcing member 25 is, for example, about 5 to 10 mm.

Figure 5:
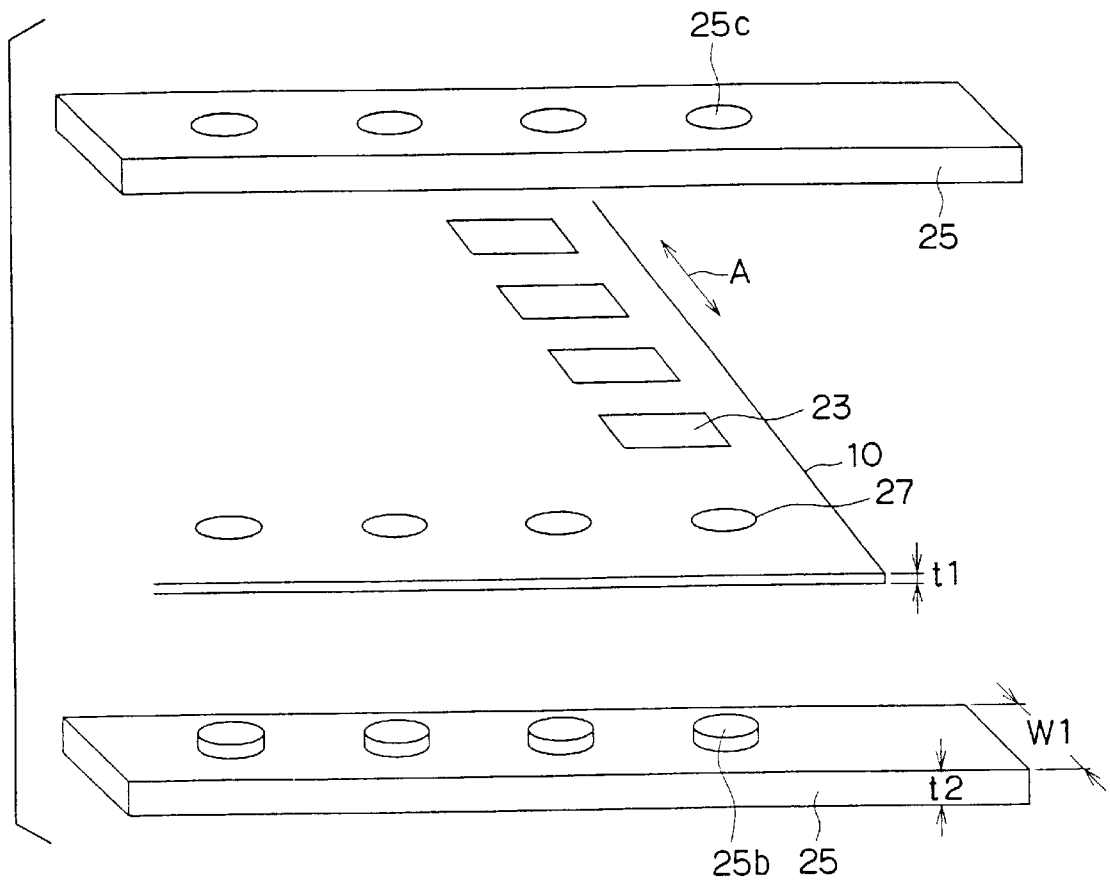
FIG. 5 is an enlarged schematic partial perspective view showing attaching structures of reinforcing members according to the first embodiment.

FIG. 5 shows an example of attaching structures for attaching the reinforcing members 25 to the film member 10. One of the reinforcing members 25 has a plurality of circular protrusions 25b integrated in the reinforcing member 25. The other one of the reinforcing members 25 has a plurality of circular through holes 25c, which are opposed to the corresponding circular protrusions 25b of the opposed reinforcing member 25. Furthermore, the corresponding end of the film member 10 has a plurality of annular through holes 27.

The circular protrusions 25b of the one reinforcing member 25 are first received through the corresponding circular through holes 27 of the film member 10 and are then press fitted into the corresponding circular through holes 25c of the other reinforcing member 25. Thus, the reinforcing members 25 are secured to the corresponding end of the film member 10 in such a manner that the corresponding end of the film member 10 is sandwiched between the reinforcing members 25.

FIG. 5 shows only one example of the attaching structures of the reinforcing members 25, and the attaching structures of the reinforcing members 25 can be modified in the following manner. That is, the reinforcing members 25 are placed to sandwich the corresponding end of the film member 10 and are then thermally fused to the film member 10. Alternatively, the reinforcing members 25 can be attached to the corresponding end of the film member 10 by double-sided adhesive tapes in such a manner that the reinforcing members 25 sandwich the corresponding end of the film member 10 therebetween. Further alternatively, the reinforcing members 25 can be attached to the corresponding end of the film member 10 by an adhesive material in such a manner that the reinforcing members 25 sandwich the corresponding end of the film member 10 therebetween. The adhesive can be one that is melted by heat and is solidified upon cooling. This adhesive is placed between each reinforcing member 25 and the film member 10 (first or second surface of the end of the film member 10). Then, the reinforcing members 25 and the corresponding end of the film member 10 are heated to melt the adhesive material and are then cooled to allow solidification of the adhesive material. Thus, the reinforcing members 25 are securely adhered to the corresponding end of the film member 10.

Next, the operation of the air-conditioning unit 1 of the first embodiment will be described. In the air-conditioning unit 1 shown in FIG. 1, the defroster-side openings 5 and the front seat face-side openings 6 are all closed by the film member 10. Thus, at this state, if each front seat foot-side opening 7 is opened by opening the corresponding door means, the air-conditioning unit 1 is operated at the front seat foot mode.

At the state shown in FIG. 1, if the drive motor 24 is rotated a predetermined amount to move the film member 10 upwardly, the film member 10 is moved upwardly until the reinforcing members 25 secured to the lower end of the film member 10 abut against the positioning portions 26, which are located at the predetermined position indicated with the dotted line B in FIG. 1. Thus, the front seat face-side openings 6 are fully opened while the defroster-side openings 5 are fully closed. As a result, the air-conditioning unit 1 is operated at the front seat face mode.

At this time, the reinforcing members 25 secured to the lower end of the film member 10 abut against the positioning portions 26 to position the film member 10 at the predetermined position before the leading end or upper end 10a of the film member 10 abuts against the innermost wall surface 19a of the upper receiving space 19.

At the above front seat face mode, if the drive motor 24 is rotated a predetermined amount in the opposite direction, the film member 10 is moved downwardly until the upper end 10a of the film member 10 is placed beyond the vehicle rear side ends of the defroster-side openings 5. Thus, the defroster-side openings 5 are fully opened, and the front seat face-side openings 6 are fully closed. As a result, at this stage, if each front seat foot-side opening 7 is fully closed by the corresponding door means (not shown), the air-conditioning unit 1 is operated at the defroster mode.

At the defroster mode, the reinforcing members 25 secured to the lower end of the film member 10 are moved into the lower receiving space 20 and are stopped before the reinforcing members 25 contact an innermost wall surface 20a of the lower receiving space 20.

In the present embodiment, when the reinforcing members 25 secured to the lower end of the film member 10 abut against the positioning portions 26, which are located at the predetermined position indicated with the dotted line B in FIG. 1, a current drive position of the drive motor 24, which is the drive means for driving the film member 10, is initialized and is thus set as an initial drive position of the drive motor 24.

In the case where the step motor is used as the drive motor 24 of the film member 10, the amount of rotation of the step motor can be determined based on a number of steps of input pulses. Thus, in such a case, it is not necessary to provide a feedback control of the amount of rotation of the drive motor based on the position of the film member 10 (i.e., the rotational position of the drive motor) measured with a position detecting means, such as a potentiometer. With elimination of the position detecting means, the structure of the drive mechanism for driving the film member 10 can be simplified.

On the other hand, in the case where the step motor is used as the drive means for driving the film member 10, and the film member 10 is moved to the predetermined position based on the number of steps of the input pulses, it is first required to set a position of the film member 10 (i.e., the rotational position of the motor) at an initial count value (i.e., the number of steps of the input pulses of the step motor=zero) at a specific position. That is, the rotational position of the step motor (position of the film member 10) needs to be initialized.

In the case where the drive means, such as the step motor, which requires the initialization of the position, is used as the drive means for driving the film member 10 having the free ends, the present embodiment allows easy and accurate initialization of the position of the drive means (film member 10).

Figure 6:
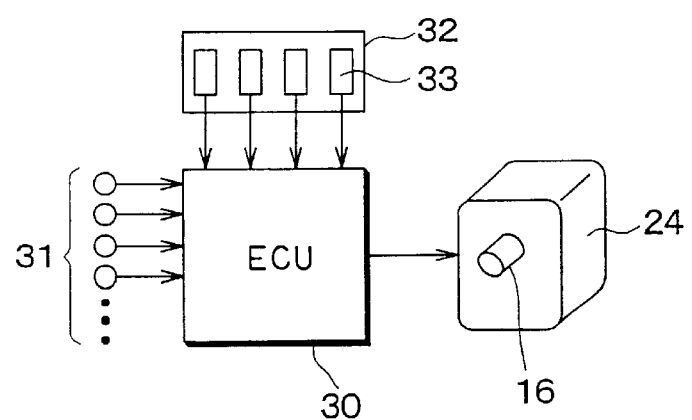
FIG. 6 is a control block diagram of a drive motor according to the first embodiment.

FIG. 6 schematically shows a control system of the step motor used as the drive motor 24. The control of the step motor 24 is carried out by an air-conditioning control device (ECU) 30. The air-conditioning control device 30 includes, for example, a microcomputer and its peripheral circuit. The air-conditioning control device 30 carries out predetermined computing processes upon execution of a predetermined program to control electric devices of the vehicle air-conditioning system.

In the present embodiment, the number of steps of the input pulses supplied to the step motor 24 is determined based on a target outlet air temperature (outlet air temperature required to maintain the passenger room at a predetermined temperature) computed by the microcomputer of the air conditioning control device 30 or based on an air outlet mode signal, which is manually set by the driver or other passenger. The amount of rotation (rotational angle) and the rotational direction of the step motor 24 are then determined based on the number of steps of the input pulses.

Signals from a group of sensors 31 that measure various environmental factors, such as an inside air temperature, an outside air temperature, an amount of solar radiation and the like, and also signals from a group of control switches 33 of an air conditioning control panel 32 are supplied to the air-conditioning control device 30.

As described above, when the film member 10 is moved upwardly, the reinforcing members 25 secured to the lower end of the film member 10 abut against the positioning portions 26 before the upper end 10a of the film member 10 contacts the innermost wall surface 19a of the receiving space 19. At this time, the current drive position of the step motor 24, which drives the film member 10, is initialized and is thus set as the initial drive position. As a result, the drive position of the step motor 24 can be initialized without applying the initializing force to the film member 10.

The initialization process of the position of the step motor 24 (film member 10) will be further described. The position of the step motor 24 (film member 10) needs to be initialized, for example, when the vehicle air-conditioning system is installed in the vehicle, and the air-conditioning control device 30 is first connected to a vehicle battery (not shown) or when the electrical connection between the air-conditioning control device 30 and the vehicle battery is reestablished after the electrical connection between the air-conditioning control device 30 and the vehicle battery is temporarily disconnected, for example, for maintenance of the vehicle battery.

Thus, in the air-conditioning control device 30, it is first determined whether a prerequisite condition (e.g., switching on of the ignition switch after the establishment of the electrical connection between the air conditioning device 30 and the vehicle battery) for setting the initial position of the step motor 24 (film member 10) is satisfied. This can be determined, for example, based on a signal indicative of establishment of the electrical connection between the air-conditioning control device 30 and the vehicle battery or based on an ON-signal of the ignition switch of the vehicle engine. When it is determined that the prerequisite condition for setting the initial position of the step motor 24 (film member 10) is satisfied, the air-conditioning control device 30 supplies electric power to the motor 24 for a predetermined time period to engage the reinforcing members 25 against the positioning portions 26.

In this way, the initial drive position of the step motor 24 (film member 10) is automatically set. This engaged position, in which the reinforcing members 25 are engaged against the positioning portions 26, is set as the initial position of the step motor 24 (film member 10) at the initial count value (i.e., the number of steps of the input pulses supplied to the step motor=zero).

Advantages of the present embodiment will be described.

(1) In the above embodiment, the opposite ends of the air outlet mode adjusting film member 10 are constructed as the free ends, and the drive force is applied to the film member 10 only at the one location. Furthermore, the winding mechanism for winding the film member 10 is not required. Thus, the drive mechanism for driving the film member 10 is substantially simplified.

Furthermore, the guides 17 for guiding the lateral edge regions of the film member 10 are integrated in the case 1a, and the film member 10 has the rigidity that is sufficient to move the film member 10 along the guides 17 by the push force applied from the drive gears 19, 20. Thus, without need for the winding mechanism, the film member 10 can be moved along the bent passage.

That is, according to the present embodiment, due to the flexibility of the film member 10, the film member 10 can be moved along the bent passage. This allows a reduction in the size of the air-conditioning case 1a and provides more flexibility in a layout design of the air-conditioning devices. This also allows elimination of the winding mechanism for winding the film member 10 and thus allows simplification of the drive mechanism for driving the film member 10.

(2) In the above embodiment, the reinforcing members 25 secured to the lower end of the film member 10 abut against the positioning portions 26 to position the film member 10 at the predetermined position before the upper end 10a of the film member 10 contacts the innermost wall surface 19a of the upper receiving space 19. Thus, the upper end 10a of the film member 10 is not deformed by the engagement with the innermost wall surface 19a of the upper receiving space 10. Also, each reinforcing member 25 is made of the resin material having the rigidity higher than that of the film member 10 and has the thickness sufficiently greater than that of the film member 10. Thus, the reinforcing members 25 are not likely to be deformed by the abutment.

(3) In the above embodiment, the reinforcing members 25 are secured to the lower end of the film member 10 and act as weights of the lower end of the film member 10. Thus, the chattering of the lower end of the film member 10 by the wind pressure can be restrained.

(4) In the above embodiment, the reinforcing members 25 are secured to the lower end of the film member 10, so that the lower end of the film member 10 is prevented from directly engaging with the lower end edges of the front seat face-side openings 6 of the air-conditioning case 1a, and operability of the film member 10 is improved.

(5) In the above embodiment, front and rear surfaces (first and second surfaces) of the lower end of the film member 10 are covered with the reinforcing members 25, so that the lower end of the film member 10 does not directly contact the wall surface of the air-conditioning case 1a and the guides 17, and thus the front and rear surfaces of the lower end of the film member 10 are not damaged by the contact. As a result, the effective movement of the film member 10 can be achieved even after a long period of operation.

(6) In the above embodiment, the reinforcing members 25 are secured to the front and rear surfaces of the lower end of the film member 10, so that improved accuracy in positioning of the film member 10 is achieved.

FIGS. 7A and 7B show a comparative example, in which a bent portion 10b is integrally formed in the lower end of the film member 10 by bending the lower end of the film member 10. The bent portion 10b of the film member 10 abuts against the positioning portions 26 of the air-conditioning case 1a, so that the film member 10 is positioned at the predetermined position. According to the comparative example, the bent portion 10b of the film member 10 tends to be obliquely deformed by the positioning portions 26 when the film member 10 is moved by the drive force applied in a direction of arrow A1, as shown in FIG. 7B. This deformation of the bent portion 10b of the film member 10 reduces the accuracy in the positioning of the film member 10. Furthermore, due to the deformation of the bent portion 10b, a deformed portion 10c is formed in the flat portion of the film member 10, resulting in a reduction of durability of the film member 10.

On the other hand, according to the present embodiment, the reinforcing members 25 are secured to the front and rear surfaces of the lower end of the film member 10, and the reinforcing members 25 both abut against the positioning portions 26 of the air-conditioning case 1a. Thus, when the reinforcing members 25 abut against the positioning portions 26, the force is equally applied from the positioning portions 26 to both the front and rear surfaces of the lower end of the film member 10 through the reinforcing members 25. As a result, an oblique force is not applied to the film member 10 during the abutment of the reinforcing members 25 against the positioning portions 26, and thus the improved accuracy in positioning of the film member 10 is achieved. In this way, the above-described initialization of the position of the motor 24 (film member 10) can be more accurately carried out.

(Second Embodiment)

In the first embodiment, as shown in FIG. 4A, the positioning portions 26 are formed in the air-conditioning case 1a in such a manner that the positioning portions 26 are located next to the film member 10 in the widthwise direction of the film member 10 when the reinforcing members 25 abut against the positioning portions 26. In a second embodiment, as shown in FIG. 8, the positioning portions 26a are formed in the inner wall surface 18 of the air-conditioning case 1a and also in the guides 17 in such a manner that the positioning portions 26a are located next to the film member 10 in a thickness direction of the film member 10 when the reinforcing members 25 abut against the positioning portions 26a.

According to the second embodiment of the present invention, a length of each reinforcing member 25 can be reduced to a length that is substantially the same as the width W of the film member 10. This arrangement is advantageous if there is not enough space in the widthwise direction of the film member 10 to accommodate the reinforcing member 25 of the first embodiment.

(Third Embodiment)

Figure 9A:
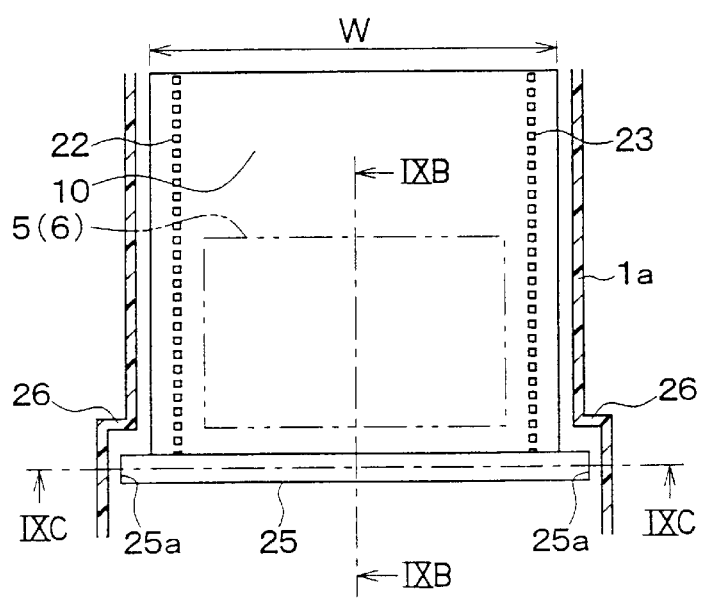
FIG. 9A is a partial plan cross-sectional view showing positioning portions for positioning the air outlet mode adjusting film member according to a third embodiment.
Figure 9B:
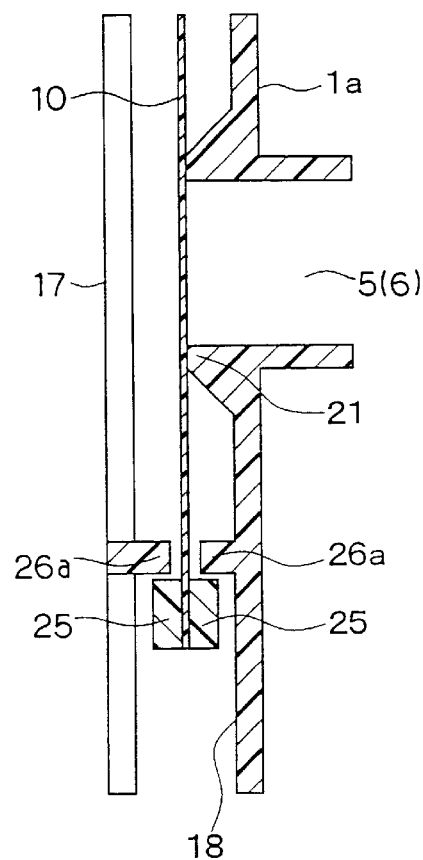
FIG. 9B is a cross-sectional view taken along line IXB—IXB in FIG. 9A.
Figure 9C:
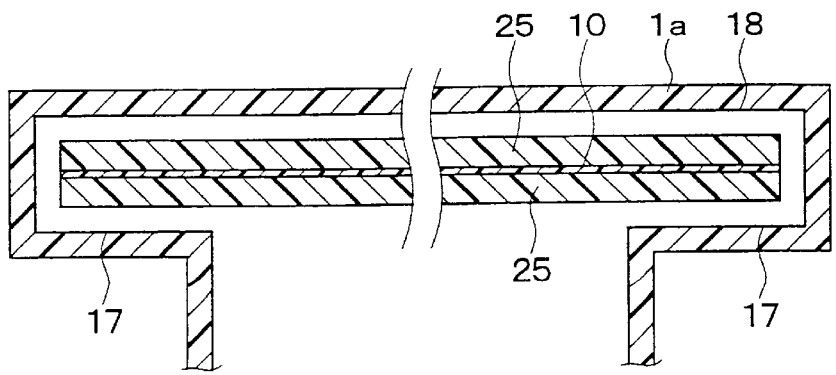
FIG. 9C is a cross-sectional view taken along line IXC—IXC in FIG. 9A.

A third embodiment is a combination of the first embodiment and the second embodiment. More specifically, as shown in FIGS. 9A to 9C, the air-conditioning case 1a includes the positioning portions (first positioning means) 26, which are located next to the film member 10 in the widthwise direction of the film member 10 when the reinforcing members 25 abuts against the positioning portions 26. The air-conditioning case 1a also includes the positioning portions (second positioning means) 26a, which are located next to the film member 10 in the thickness direction of the film member 10 when the reinforcing members 25 abut against the positioning portions 26a. With the above arrangement, positioning of the film member 10 at the predetermined position can be more reliably carried out.

(Fourth Embodiment)

Figure 10A:
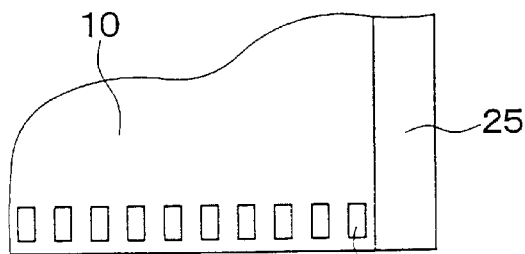
FIG. 10A is a schematic partial plan view showing an air outlet mode adjusting film member according to a fourth embodiment of the present invention.
Figure 10B:
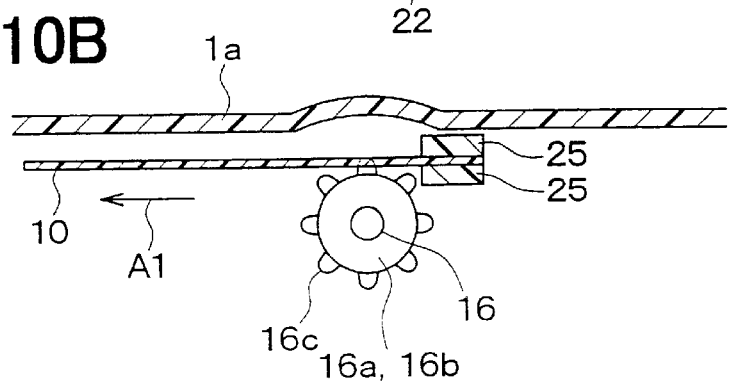
FIG. 10B is a schematic partial cross sectional view showing a way of positioning the air outlet mode adjusting film member of the fourth embodiment.

In the first to third embodiments, the film member 10 is positioned at the predetermined position by abutting the reinforcing members 25 of the film member 10 against the positioning portions 26a of the air-conditioning case 1a. However, in a fourth embodiment, as shown in FIGS. 10A and 10B, gear teeth 16c of the drive gears 16a, 16b engage with the reinforcing members 25 and are thus locked to stop the movement of the film member 10 in the direction of arrow A1, thereby positioning the film member 10 at the predetermined position. Even with such positioning of the film member 10, advantages similar to those of the first embodiment can be achieved.

The above embodiments can be modified as follows.

In the first embodiment, each front seat foot-side opening 7 is opened and closed by the corresponding door means, which is different from the air outlet mode adjusting film member 10. However, the defroster-side openings 5, the front seat face-side openings 6 and the front seat foot-side openings 7 can be opened and closed using the single air outlet mode adjusting film member 10.

Figure 11A:
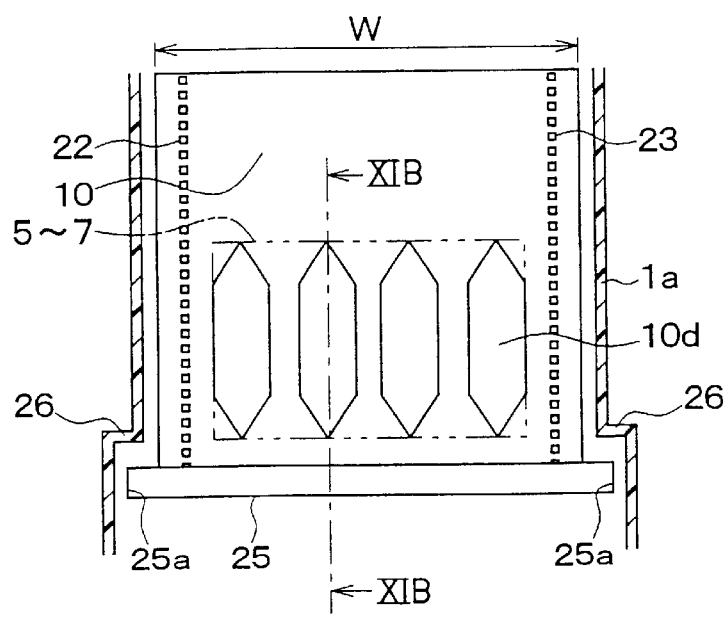
FIG. 11A is a schematic partial plan view showing a modification of the air outlet mode adjusting film member.
Figure 11B:
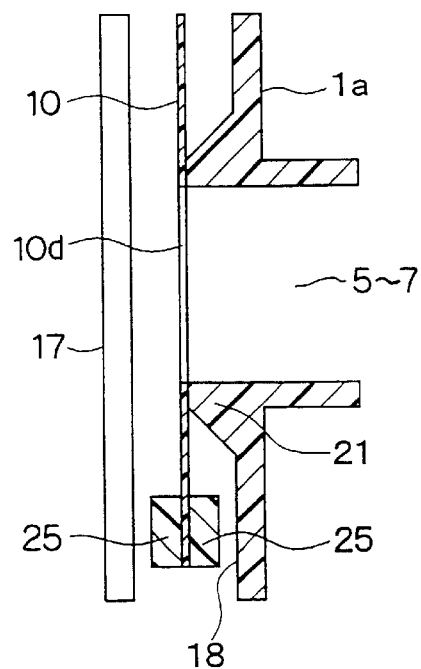
FIG. 11B is a cross-sectional view taken along line XIB—XIB in FIG. 11A.

In such an instance, as shown in FIGS. 11A and 11B, openings 10d can be formed in the air outlet mode adjusting film member 10. Each of the air outlet openings 5–7 of the air-conditioning case 1a is opened when the openings 10d of the film member 10 are aligned with the corresponding air outlet opening 5–7.

In the case shown in FIGS. 11A and 11B, the openings 10d of the film member 10 are arranged in the widthwise direction of the film member 10, and each opening 10d is shaped into a hexagon. In this way, ends of each opening 10d, which are opposed in the reciprocating direction of the film member 10, will not be easily caught by the edges of each air outlet opening 5–7.

In each of the above embodiments, the present invention is embodied in the air outlet mode adjusting film member 10 of the vehicle air-conditioning system. However, the present invention can be embodied in the air mixing film member 13 of the vehicle air-conditioning system. Furthermore, the invention can be embodied in an inside/outside air switching film member for switching the air source between the inside air and the outside air in the vehicle air-conditioning system. The present invention can be also embodied to open and close various air passages in various technical fields.

In the above embodiments, the reinforcing members 25 are secured to the lower end of the film member 10. However, the reinforcing members 25 are not required to be secured to one of the ends of the film member 10. For example, the reinforcing members 25 can be secured to the film member 10 at a position slightly spaced from one of the ends of the film member 10. Alternatively, the reinforcing members 25 can be secured to the middle of the film member 10 in the reciprocating direction of the film member 10.

In each of the above embodiments, the drive shaft 16 is provided only at one location. However, more than one drive shaft 16 can be arranged in the reciprocating direction A of the film member 10 to apply the drive force to the film member 10.

In the above embodiments, the motor is used as the drive means. However, in place of the motor, a manual operating mechanism can be provided as the drive means. Operational force of the manual operating mechanism is transmitted to the film member 10 to move the film member 10.

Additional advantages and modifications will readily occur to those skilled in the art. The invention in its broader terms is therefore, not limited to the specific details, representative apparatus, and illustrative examples shown and described.

What is claimed is:

1. An air passage opening and closing system comprising:
   a case, which forms at least one air passage;
   a film member, which is reciprocable in first and second directions in the case and has opposite first and second free ends, wherein the film member opens and closes the at least one air passage depending on its position relative to the at least one air passage;
   at least one reinforcing member, which is secured to the film member to provide additional strength to the film member;
   a drive means for reciprocating the film member in the first and second directions; and
   at least one positioning means for positioning the film member at a predetermined position, wherein:
   the at least one positioning means is arranged stationary relative to the case; and
   when the film member is moved in one of the first and second directions, the at least one reinforcing member abuts against the at least one positioning means to position the film member at the predetermined position.

2. An air passage opening and closing system according to claim 1, wherein when the film member is moved in the one of the first and second directions, the at least one reinforcing member abuts against the at least one positioning means before a leading end of the film member abuts against a wall surface of the case.

3. An air passage opening and closing system according to claim 1, wherein when the at least one reinforcing member abuts against the at least one positioning means to position the film member at the predetermined position, a current drive position of the drive means is initialized and thus is set as an initial drive position of the drive means.

4. An air passage opening and closing system according to claim 1, wherein the at least one reinforcing member is secured to the film member at a position adjacent to one of the first and second free ends of the film member.

5. An air passage opening and closing system according to claim 1, wherein the at least one positioning means is located next to the film member in a widthwise direction of the film member when the at least one reinforcing member abuts against the at least one positioning means.

6. An air passage opening and closing system according to claim 1, wherein the at least one positioning means is located next to the film member in a thickness direction of the film member when the at least one reinforcing member abuts against the at least one positioning means.

7. An air passage opening and closing system according to claim 1, wherein the at least one positioning means includes:
   at least one first positioning means, which is located next to the film member in a widthwise direction of the film member when the at least one reinforcing member abuts against the at least one first positioning means; and
   at least one second positioning means, which is located next to the film member in a thickness direction of the film member when the at least one reinforcing member abuts against the at least one second positioning means.

8. An air passage opening and closing system comprising:
   a case, which forms at least one air passage;
   a film member, which is reciprocable in first and second directions in the case and has opposite first and second free ends, wherein the film member opens and closes the at least one air passage depending on its position relative to the at least one air passage and includes at least one set of gear engaging portions, which are arranged at substantially equal intervals in a direction parallel to the first and second directions;
   at least one drive gear having a plurality of gear teeth, which are meshed with the at least one set of the gear engaging portions of the film member to reciprocate the film member;
   a drive means for rotating the at least one drive gear; and
   at least one reinforcing member, which is secured to the film member between the at least one set of the gear engaging portions and one of the first and second free ends to provide additional strength to the film member, wherein when the film member is moved in one of the first and second directions, at least one of the teeth of the at least one drive gear is securely engaged with the at least one reinforcing member to position the film member at a predetermined position.

9. An air passage opening and closing system according to claim 8, wherein when the film member is moved in the one of the first and second directions, the at least one of the teeth of the at least one drive gear is securely engaged with the at least one reinforcing member before a leading end of the film member abuts against a wall surface of the case.

10. An air passage opening and closing system according to claim 8, wherein when the at least one of the teeth of the at least one drive gear is securely engaged with the at least one reinforcing member to position the film member at the predetermined position, a current drive position of the drive means is initialized and thus is set as an initial drive position of the drive means.

11. An air passage opening and closing system according to claim 1, wherein the at least one reinforcing member is made of a resin material, which has rigidity higher than that of the film member.

12. An air passage opening and closing system according to claim 1, wherein the at least one reinforcing member includes a couple of reinforcing members, which are attached to opposite first and second surfaces of the film member, respectively.

13. An air passage opening and closing system according to claim 1, wherein the case includes at least one guide means for guiding the film member.

14. An air-conditioning system of a vehicle comprising an air passage opening and closing system, the air passage opening and closing system including:
   a case, which forms at least one air passage;
   a film member, which is reciprocable in first and second directions in the case and has opposite first and second free ends, wherein the film member opens and closes the at least one air passage depending on its position relative to the at least one air passage;
   at least one reinforcing member, which is secured to the film member to provide additional strength to the film member;
   a drive means for reciprocating the film member in the first and second directions; and
   at least one positioning means for positioning the film member at a predetermined position, wherein:
      the at least one positioning means is arranged stationary relative to the case;
      when the film member is moved in one of the first and second directions, the at least one reinforcing member abuts against the at least one positioning means to position the film member at the predetermined position; and
      the at least one air passage includes a plurality of air outlet openings, from which conditioning air of the air-conditioning system is blown toward various portions of a passenger room of the vehicle.

15. An air-conditioning system according to claim 14, wherein when the film member is moved in the one of the first and second directions, the at least one reinforcing member abuts against the at least one positioning means before a leading end of the film member abuts against a wall surface of the case.

16. An air-conditioning system of a vehicle comprising an air passage opening and closing system, the air passage opening and closing system including:
   a case, which forms at least one air passage;
   a film member, which is reciprocable in first and second directions in the case and has opposite first and second free ends, wherein the film member opens and closes the at least one air passage depending on its position relative to the at least one air passage and includes at least one set of gear engaging portions, which are arranged at substantially equal intervals in a direction parallel to the first and second directions;
   at least one drive gear having a plurality of gear teeth, which are meshed with the at least one set of the gear engaging portions of the film member to reciprocate the film member;
   a drive means for rotating the at least one drive gear; and
   at least one reinforcing member, which is secured to the film member between the at least one set of the gear engaging portions and one of the first and second free ends to provide additional strength to the film member, wherein:
      when the film member is moved in one of the first and second directions, at least one of the teeth of the at least one drive gear is securely engaged with the at least one reinforcing member to position the film member at a predetermined position; and
      the at least one air passage includes a plurality of air outlet openings, from which conditioning air of the air-conditioning system is blown toward various portions of a passenger room of the vehicle.

17. An air-conditioning system according to claim 16, wherein when the film member is moved in the one of the first and second directions, the at least one of the teeth of the at least one drive gear is securely engaged with the at least one reinforcing member before a leading end of the film member abuts against a wall surface of the case.

* * * * *